April 12, 1932. F. LEOPOLD, JR 1,853,130
MOLD OPENING DEVICE
Filed Aug. 7, 1929 3 Sheets-Sheet 1

INVENTOR
*Frederick Leopold, Jr,*
BY *Robert M Pierson,*
ATTORNEY

April 12, 1932. F. LEOPOLD, JR 1,853,130
MOLD OPENING DEVICE
Filed Aug. 7, 1929 3 Sheets-Sheet 2

INVENTOR
Frederick Leopold, Jr.,
BY Robert McPherson,
ATTORNEY

April 12, 1932.  F. LEOPOLD, JR  1,853,130
MOLD OPENING DEVICE
Filed Aug. 7, 1929   3 Sheets-Sheet 3

INVENTOR
*Frederick Leopold, Jr.,*
BY *Robert M Pierson,*
ATTORNEY

Patented Apr. 12, 1932

1,853,130

UNITED STATES PATENT OFFICE

FREDERICK LEOPOLD, JR., OF HARMONVILLE, PENNSYLVANIA, ASSIGNOR TO LEE RUBBER & TIRE CORPORATION, OF CONSHOHOCKEN, PENNSYLVANIA, A CORPORATION OF NEW YORK

MOLD OPENING DEVICE

Application filed August 7, 1929. Serial No. 384,186.

This invention relates to apparatus for opening molds such as portable tire-vulcanizing molds. After such molds leave the pot vulcanizer they are commonly carried flatwise in series along a conveyor and opened by men with crow-bars standing alongside.

My object is to provide an automatic or semi-automatic apparatus for properly aligning or centering the molds as they come to the opening position and for opening them with the aid of hydraulic or other power, thus saving a great deal of time and labor as compared with the hand method. My invention is also an improvement upon prior mold-opening mechanisms.

Of the accompanying drawings, Fig. 1 is a plan view of a mold-opening apparatus embodying my invention.

Figure 1:
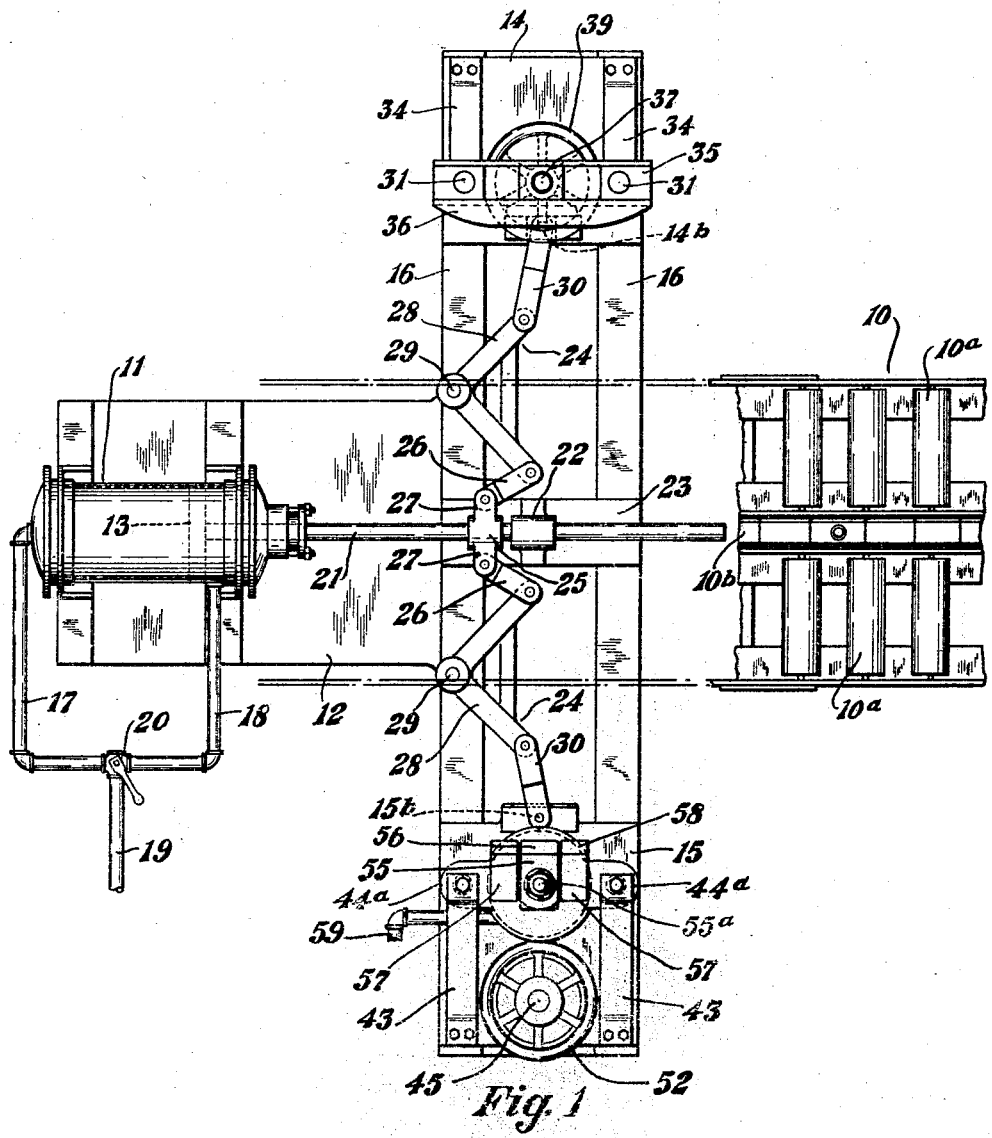

In the drawings, 10 is an anti-friction, horizontal track-way or mold conveyor having two sets of rollers 10$^a$ and a propelling chain 10$^b$ between them with suitable lugs for engaging and advancing the molds. Extending longitudinally underneath said conveyor is a base-plate 12 which, in this instance, is fixed with reference to the conveyor so that the mold-opening devices operate without any movement of translation longitudinally of the conveyor, although I do not wholly limit myself to such fixed position.

11 is a double-acting fluid-pressure cylinder mounted on the plate 12 and having a piston 13 movable parallel with the direction of travel of the molds and connected to impart lateral positioning movements to a pair of carriages 14 and 15 which are slidably mounted upon a pair of transverse guide beams 16 located below the level of the conveyor. The bottom plates of the carriages are formed with grooves 14$^a$ and 15$^a$ to receive the top flanges of the guide beams. Pressure fluid, such as compressed air, is supplied to and discharged from opposite ends of the cylinder 11 through a pair of pipes 17, 18, connected with a supply pipe 19 and with a 3-way hand valve 20 for alternately charging one end while exhausting the other end and vice versa.

The piston rod 21 extends through a guide bearing 22 on a supporting plate 23 mounted on the guide beams 16 and is connected through levers and linkages 24 with the respective carriages 14 and 15, for oppositely reciprocating said carriages, the connections including a collar 25 on the rod 21, a pair of links 26 connecting a pair of ears 27 on said collar with the inner arms of a pair of angle-levers 28 pivoted at 29, 29 on one of the guide beams, and a pair of links 30 connecting the outer ends of said arms with pins 14$^b$ and 15$^b$ on the inner edges of the carriages.

Figure 2:
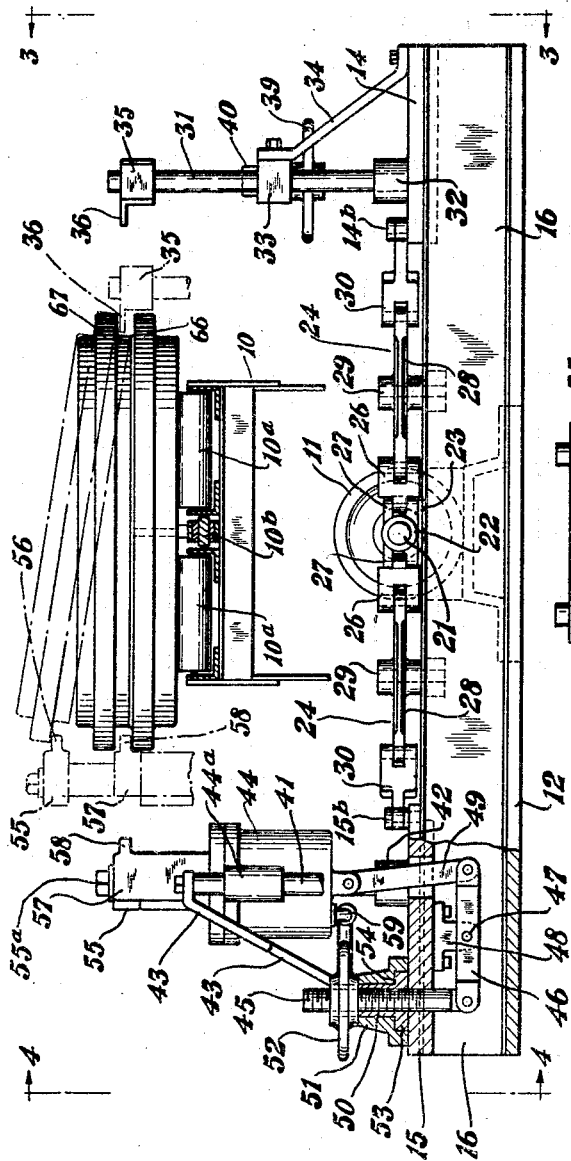
Fig. 2 is a transverse section showing a mold in opening position.
Figure 3:
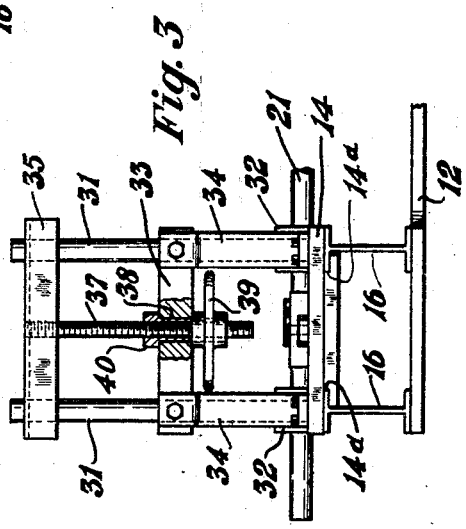
Fig. 3 is a side elevation from the plane 3—3 of Fig. 2, partly in section.
Figure 4:
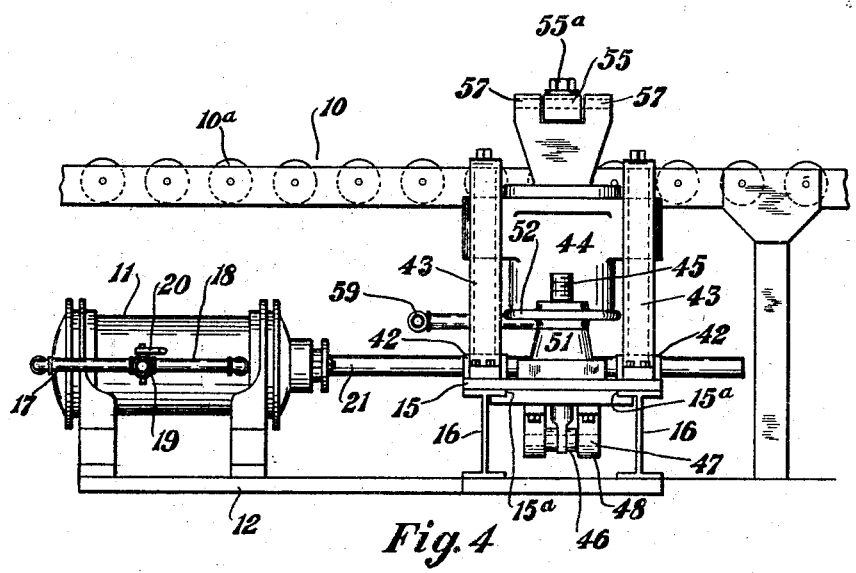
Fig. 4 is a side elevation from the plane 4—4 of Fig. 2.

The carriage 14 has a pair of vertical posts 31 supported in bosses 32 on its base-plate and connected by a cross-bar 33 from the back of which diagonal braces 34 extend to the base-plate. 35 is a cross-bar or head mounted to slide vertically on the upper ends of the posts 31 and inwardly formed with a horizontal mold-engaging flange or jaw 36, said flange being adapted to enter between the mold sections 66, 67 as indicated in the broken-line position of the cross-head 35 in Fig. 2 so as to overlie the edge of the lower mold section while the shoulder or inner vertical face of said cross-head abuts laterally against the lower mold flange to exert a lateral shifting action on the mold to center the latter when necessary.

Provision is made for vertically adjusting the cross-head 35 by a screw 37 attached thereto between the posts 31 and engaging the threads of a nut 38 mounted to turn in the cross-bar 33 and keyed to the hub of a hand-wheel 39, which hand-wheel and nut are held from vertical movement by said hub and an end flange 40 on the nut. By turning the hand-wheel 39, the cross-head 35 and its jaw 36 may be raised and lowered to accommodate molds of different thickness and bring said jaw into horizontal alignment with the space between the mold flanges.

The carriage 15 has a pair of vertical posts 41 mounted in bosses 42 on its base plate and steadied by means of diagonal braces 43. Between said posts is mounted a hydraulic cylinder 44 formed with side bearings 44ª slidably embracing the posts 41. For vertically adjusting the position of said cylinder to accommodate molds of different thickness, I provide a vertical screw 45 connected at its lower end with one arm of a lever 46 fulcrumed at 47, the other arm of said lever being connected by link 49 with a pin on the bottom of the cylinder 44. 50 is a nut engaging the screw 45 and mounted to turn in a fixed bearing 51 on the base-plate of the carriage, said nut being keyed to the hub of a hand-wheel 52 and having an end flange 53 bearing against a thrust shoulder 54, whereby the nut and hand-wheel are held against vertical movement so that when the hand-wheel is turned, the cylinder 44 will be raised or lowered.

55 is a head-block or jaw member attached to the ram or piston-rod 55ª of cylinder 44 and inwardly formed with a horizontal jaw-flange 56 for insertion between the flanges of the upper and lower mold members to perform the mold-opening operation by raising the upper mold member at one edge as hereinafter described. The cover of cylinder 44 is formed with a pair of fixed jaw blocks or standards 57 inwardly formed with jaw flanges 58 for insertion between the mold sections to hold down the lower section while the upper one is being raised by the jaw block 55. When said jaw block 55 is in its lowest position, its flange 56 is in horizontal line between the two flanges 58. The vertical shoulders below the jaw flanges on the blocks 55 and 57 are adapted to abut laterally against the flange of the lower mold section to shift and center the latter on the conveyor if necessary.

Figure 5:
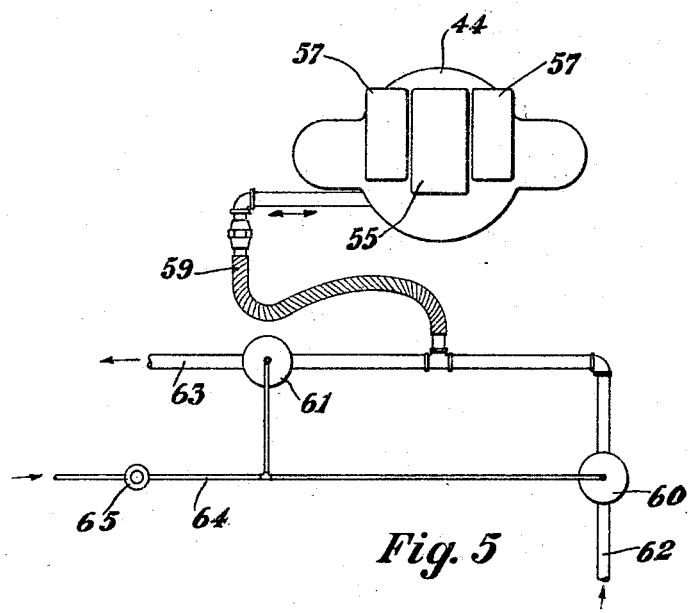
Fig. 5 is a diagrammatic plan view showing the opener, together with its piping and control valves.

For charging and discharging the cylinder 44, a pipe 59, including a flexible section, leads from its lower end and connects with the piping and the control valves illustrated in Fig. 5. 60 and 61 are diaphragm valves of any suitable construction adapted to be operated by a fluid such as compressed air to shift their valve members and control the fluid flow to and from the cylinder 44. Valve 60 controls the admission and is located in a hydraulic supply pipe 62. Valve 61 controls the discharge and is located in an exhaust pipe 63. 64 is a compressed-air pipe connected with the diaphragm chambers of the valves 60 and 61 and containing a foot valve 65 within convenient reach of the operator for charging and discharging said diaphragm chambers.

In the operation of this apparatus, tire molds are brought from the pot vulcanizers and carried flatwise in series along the conveyor 10. As each one comes between the carriages 14, 15, while the latter are in their retracted positions indicated in Figs. 1 and 2, air pressure is admitted to the front end of cylinder 11 by manipulating the hand-valve 20, and the collar 25 is drawn back, causing the carriages to approach and center the mold on the conveyor, if necessary, by the abutting of the head 35 on one side or heads 55, 57 on the other side, against the one or the other side edge of the mold.

The jaw 36 on one side and the jaws 56, 58 on the other side having been brought to the proper level to register between the flanges of the mold halves 66, 67 by means of the hand-wheels 39, 52, and the carriages brought into center the mold as just described, the operator then steps on the foot-valve 65, causing the valve 60, to be opened by compressed air, admitting hydraulic pressure to cylinder 44, raising head 55 and causing its jaw 56 to push upwardly against the flange of the upper mold section and partially separate it from the lower one while the lower section is held down by the fixed jaws 58, thus "breaking" the mold as indicated by the broken-line positions of the parts in Fig. 2. The jaw 36 is also in position to exert a hold-down action on the lower mold section at the opposite side if required, although its function is not so important and said jaw might be omitted without destroying the operativeness of the mechanism, except that its presence is desirable when the mold is to be emptied at the opening station.

The conveyor chain 10ᵇ may be stopped during the mold-opening operation, the top mold section lifted off with a suitable tackle while the lower half is held down by the jaws 36 and 58, the cured tire removed, a fresh one inserted and the top section restored; or the emptying and refilling of the mold may take place further along on the conveyor.

When the mold has been broken, the operator's foot is removed from valve 65, which then causes the admission valve 60 to be closed and the exhaust valve 61 to be opened, thereby dropping the head 55 and realigning the fixed and movable jaws 56 and 58 of the opener. After the mold under treatment has passed on, the carriages 14, 15 are restored to their outward positions by operation of the cylinder 11, another mold is brought between them and the foregoing cycle is repeated.

The described embodiment is obviously subject to rather wide variation without departing from the scope of my invention as defined in the claims.

I claim:

1. Mold-opening apparatus comprising means for supporting a mold while being opened, a pair of carriages having means for laterally contacting the molds to center them on said supporting means, mechanism for oppositely moving said carriages, and mold-opening means on one of said carriages.

2. Mold-opening apparatus comprising a mold conveyor, a pair of carriages slidable transversely of said conveyor and having mold-shifting means, and a mold-opener on one of said carriages.

3. Mold-opening apparatus comprising a substantially horizontal mold conveyor, carriage guides mounted transversely below the level of said conveyor, mold-centering carriages slidable on said guides and one of them having a mold opener, a reciprocatory fluid-pressure device, and connections from said device to the respective carriages for imparting opposite reciprocating movements to the latter.

4. Mold-opening apparatus comprising a mold conveyor, a pair of carriages slidable transversely of said conveyor and having mold-shifting means, a mold-opener on one of said carriages, and screw means for raising and lowering said mold-shifting means and said mold-opener on their carriages.

5. Mold-opening apparatus comprising a substantially horizontal mold conveyor, a pair of carriages slidable transversely thereof, a vertically-adjustable mold shifter mounted on one of said carriages, a vertically-adjustable combined mold shifter and opener mounted on the other carriage, and means for oppositely moving said carriages to center the molds in opening position on said conveyor.

6. Mold-opening apparatus comprising a mold conveyor, a carriage slidable laterally thereof and having a vertical guide, a mold-shifting head slidable on said guide and having a mold hold-down jaw, and mold-opening means.

7. Mold-opening apparatus comprising a guideway for a series of tire molds, a pair of supports mounted adjacent the sides of said guideway and adjustable transversely thereof, jaws carried by said supports for holding down the lower section of a mold on opposite sides thereof, a mold-opening jaw carried by one of said supports, and means for operating said mold-opening jaw.

In witness whereof I have hereunto set my hand this 2nd day of August, 1929.

FREDERICK LEOPOLD, Jr.